Nov. 18, 1941.                R. E. FRANKLIN                2,263,267
                            TUBING JOINT BREAKER
                            Filed June 22, 1940                4 Sheets-Sheet 1

Inventor: Roy E. Franklin
By his Attorney:

Nov. 18, 1941.　　　R. E. FRANKLIN　　　2,263,267
TUBING JOINT BREAKER
Filed June 22, 1940　　　4 Sheets-Sheet 2

Inventor: Roy E. Franklin
By his Attorney

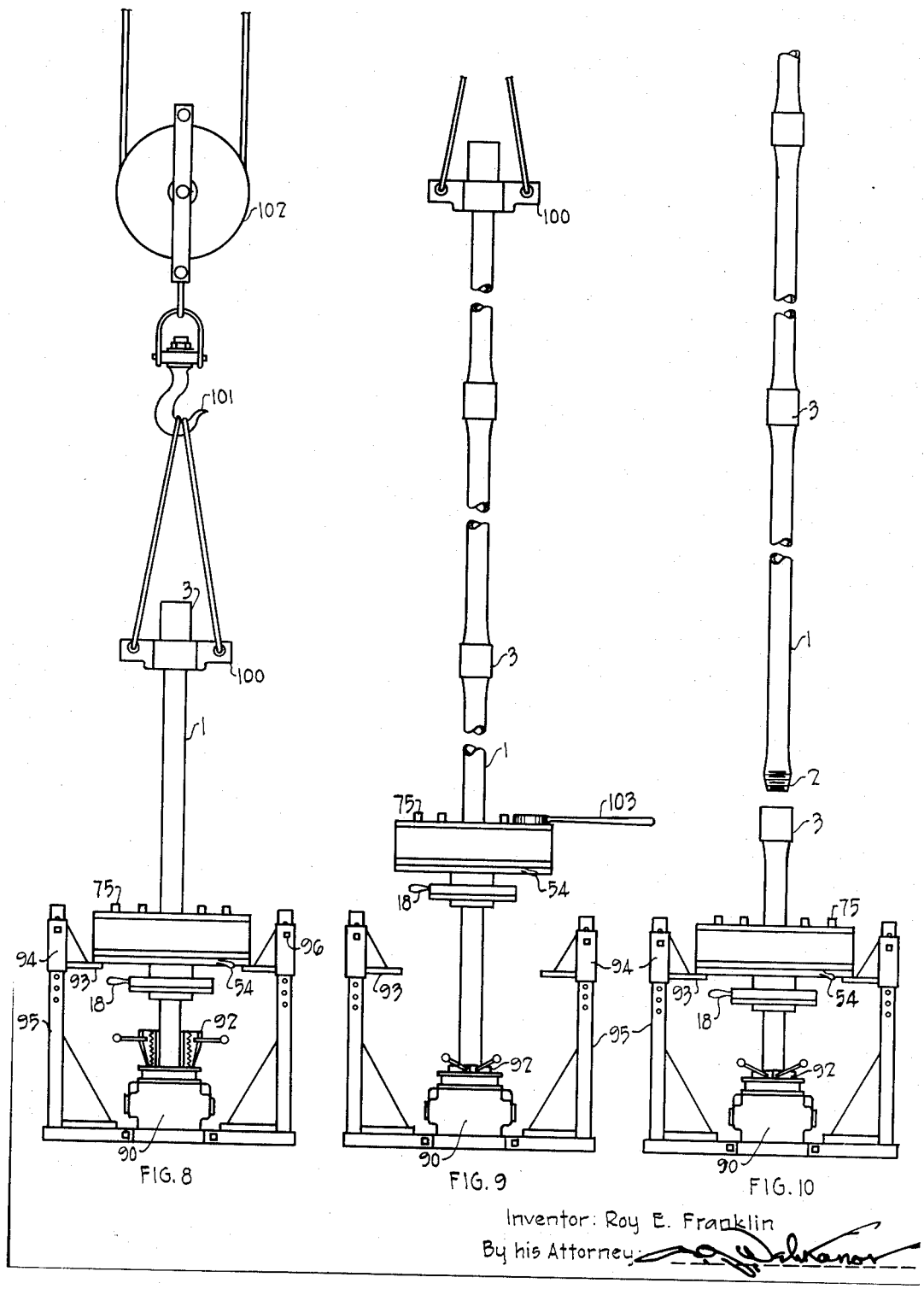

Patented Nov. 18, 1941

2,263,267

UNITED STATES PATENT OFFICE 2,263,267

TUBING JOINT BREAKER

Roy E. Franklin, Perry, Okla., assignor to Shell Development Company, San Francisco, Calif., a corporation of Delaware Application June 22, 1940, Serial No. 341,973

7 Claims. (Cl. 255—35)

The present invention relates to a device for unscrewing and screwing oil well tubing or drill pipe and the like and pertains more particularly to a device for loosening or "breaking" pipe or tubing joints without injury or deformation of the pipe or tubing and the couplings.

Heretofore, in unscrewing sections of tubing it has been the practice to apply two pipe tongs to the pipe, one above the joint and the other below. With the lower tongs anchored the handle of the upper tongs is jerked manually or by means of a rope or line connection between the handle of the upper tongs and the "cathead" spool on the hoisting machine. While jerking the upper tongs, it is generally necessary to tap or hammer the tubing joint or coupling in order to start it unscrewing, that is, to "break" the joint. The pipe above the loosened joint is then rapidly rotated by manually turning the upper tongs or by means of a spinning rope with one end coiled about the pipe and the other end coiled about the "cathead" spool of the hoisting machinery.

However, inspection of pipe or tubing couplings which have been even rather lightly tapped indicate that permanent deformation has taken place with the resultant possibility of leakage at the joint. Deleterious effects also arise from gripping the tubing with one or two knife-edge grips in the present tongs and from the torsional spring in the tubing due to the wide separation of the gripping tongs.

It is therefore an object of the present invention to provide a device having suitable grips for more effectually surrounding the tubing and coupling elements and means to apply optimum torque leverage in the operation of breaking loose the threaded joints when pulling strings of tubing out of wells, whereby injury and deformation to tubing couplings is prevented.

It is an object of the present invention to provide a device for unscrewing and screwing pipe and tubing joints, which will eliminate the necessity of hammering or tapping the joint or coupling with the resultant possibility of deformation thereof.

It is another object to provide a portable pipe unscrewing device with means to grip the tube on the upset portion near the joint or coupling, where the tube has the greatest cross-sectional area and, consequently, the most strength.

Another object is to provide a device having a large area of gripping teeth in a number of serrated jaws which more nearly completely surround the tubing, whereby the possibility of crushing or tending to deform, split, or cut materially into the tubing wall is minimized.

Another object is to provide a device having a rigidly constructed frame or housing in convenient form for portability and operation to transmit opposing forces of high magnitude in breaking loose joints of tubing.

A further object is to provide a device having two sets of gripping jaws arranged in close proximity and adapted to be spaced on each side of the joint, whereby the joint may be "broken" and unscrewed while imparting a minimum of torsional spring to the tubing.

Another object is to provide a device having gripping jaws which grip tighter as increasing force is applied to break loose a joint in strings of tubing.

Another object is to provide a device for attaining the foregoing objects and having means for automatically centering and positioning the gripping jaws in most efficient relation to the joint or coupling.

Still another object is to provide a device for "breaking" and unscrewing tubing joints, which may be operated either mechanically by the use of an electric, pneumatic, hydraulic, or other power-driven motor, or manually.

A further object is to provide a tubing joint-breaking device arranged so that the entire threaded joint may be unscrewed by use of a power-driven socket wrench or by use of hand tongs, as desired.

An additional object is to provide a device attaining the foregoing objects, having replaceable and reversible gripping jaws, whereby the device may be used not only for "breaking" and unscrewing tubing joints but also for making up tubing strings or screwing together sections of tubing and for various sizes of pipe and tubing.

A still further object is to provide a tubing joint-breaking device, wherein the tubing gripping jaws are carried by a support adapted to transmit the necessary breaking torque to the jaws and to rise with the unscrewing of the tubing element out of the coupling element until the joint is completely disconnected.

Other objects of the invention will be readily apparent from the following description taken in reference to the drawings, wherein:

Figure 8 is a side view of the present device in inoperative position about well tubing.

Figure 9 is a side view of the present device in operative position about a joint in well tubing before "breaking."

Figure 10 is a side view of the present device in inoperative position after a joint in well tubing has been unscrewed.

Briefly, the present invention comprises the combination of a set of positioning fingers surrounding the tubing and adapted to engage the upper portion of the joint or coupling against vertical motion, and, closely adjacent both above and below the positioning fingers, a set of pipe-gripping jaws surrounding the tubing, all the sets of fingers and jaws being adapted for movement to and from the tubing in response to manual control and carried by a tubular housing surrounding the tubing string.

Figure 1:
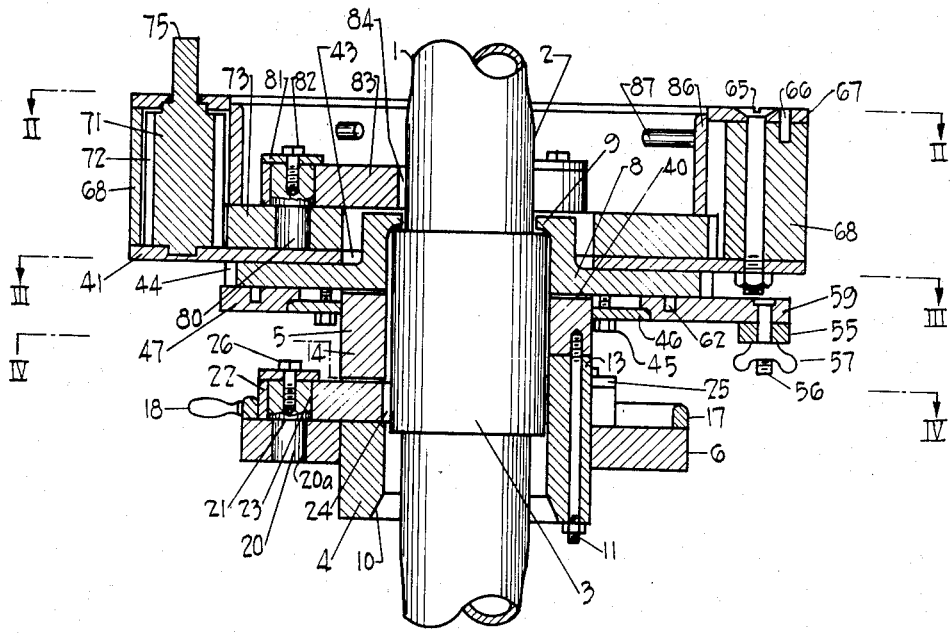
Figure 1 is a vertical cross-sectional view of the present device in operative position about a tubing coupling.

Referring particularly to Figures 1, 2, 3 and 4, a preferred embodiment of the present device will be described in detail. The device is shown in operative position about a section of tubing 1, having an upset portion 2 externally threaded in its lower portion for screwing engagement with a coupling 3. Preferably four crank- or angle-shaped movable positioning fingers 8, each having a pin 62 attached to the underneath of its outer end for a subsequently described purpose, support the entire weight of the device by means of flange 9 thereon, which is preferably slightly beveled as shown in Figure 1, said flange 9 engaging the shoulder formed by the upper rim of the coupling 3, when the fingers 8 are in operative position.

Figure 4:
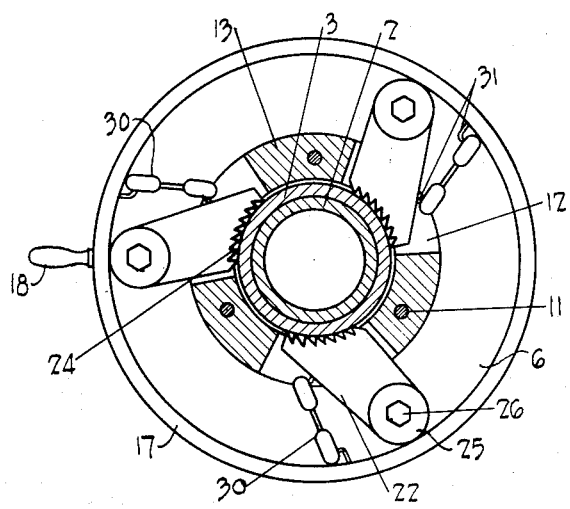
Figure 4 is a transverse cross-sectional view taken along the line IV—IV of Figure 1.

The lower sleeve section 4 of the housing has a bore somewhat larger than the outside diameter of the tubing coupling and is preferably beveled, as indicated at 10, to facilitate the passage of the coupled tubing therethrough. The upper sleeve section 5 of the housing has the same bore as the lower sleeve section 4 and is attached thereto by cap screws 11. The opposing faces of sleeves 4 and 5 are machined to form therebetween three wedge-shaped slots, as shown in Figure 4, and a three-jaw fit; that is, the upper end of the lower sleeve section 4 is formed with the three wedge-shaped slots 12 and three wedge-shaped projections 13 therebetween (Figures 1 and 4), and the lower end of the upper sleeve section 5 is formed with three wedge-shaped slots to accommodate the projections 13 of the lower sleeve 4 and three projections 14 (Figure 1) which project axially part way into the slots 12 of the lower sleeve section 4, leaving a clearance to accommodate jaws 22, as will be described later. This three-jaw fit provides extreme rigidity and avoids shearing stress on the cap screws 11.

Welded or otherwise fastened about the sleeve 4 just below the slots 12 is a circular frame plate 6, on which rests a freely rotatable exterior ring 17 provided with a handle 18 extending outwards therefrom. The frame plate 6 has three (or any other desired number) bores 20a, into which are placed three lower jaw pins 20, preferably of step-section design as shown at 21, and about each of these pins 20 is fitted above the plate 6 a removable and pivotable jaw 22, provided for this purpose with a bore 23 in one end thereof, the jaws 22 being more clearly shown in Figure 4. The jaws 22 have curved and vertically-serrated faces 24 on the end opposite to the bore 23 and are, thereby, adapted to grip the tubing coupling 3. The center of curvature radius of curved faces 24 is not concentric with the axis of sleeve section 4 nor on the longitudinal center line of the jaws 22; that is, the faces 24 are curved unsymmetrically with regard to the longitudinal center line of the jaws 22. The curved faces 24 are preferably formed with a radius of curvature slightly longer than the outside radius of the tubing coupling and of such arc length that the three jaws together make contact over at least about one-half the circumference of the tubing coupling. Washers 25 and cap screws 26, screwing into the pins 20, keep the jaws 22 in place on the pins. The outer rounded ends of jaws 22 are in contact with the inner cylindrical face of ring 17, as shown in Figure 1, or the ring may be fitted into a suitable circular groove in plate 6, in order to keep said ring centered with regard to the plate 6.

A spring rod assemblage, generally designated as 30, is attached by means of pins 31 to the rotatable ring 17 and to the forward or long side of each jaw 22, and forms means of actuating the jaws 22 into or out of tubing gripping position in response to a rotation of the ring 17. As shown more clearly in Figure 5, the spring rod assemblage 30 consists of a rod 32, cylindrical housings 33 surrounding the two ends of rod 32, a shoulder 34 on each end of said rod 32, a spring 35 surrounding rod 32 and compressible between the shoulder 34 and the housing. Each housing may be formed from a section of tubing crimped at one end behind the inserted rod shoulder 34 and spring 35 and crimped at the other end about an inserted ball 37 attached to pin 31, which projects through a slot 38 provided therefore in said housing.

Figure 3:
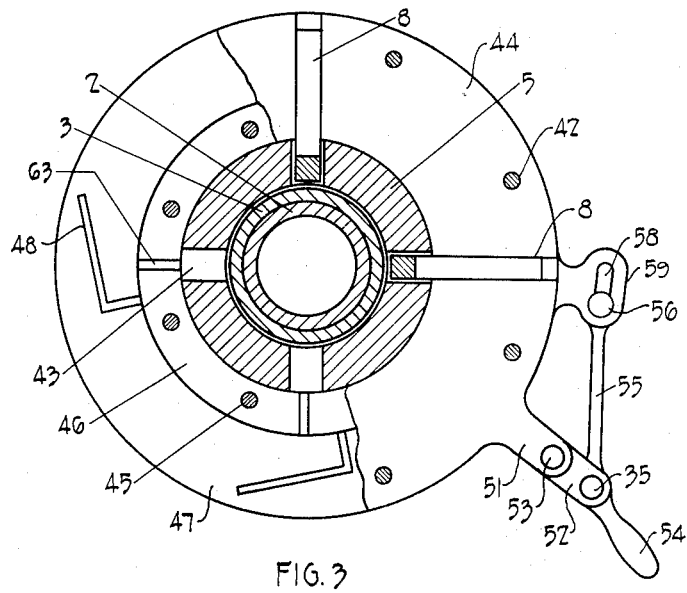
Figure 3 is a transverse cross-sectional view taken along the line III—III of Figure 1 with two positioning fingers and two finger spacer plates removed.

The upper end of upper sleeve section 5 is slotted, as shown at 40, to allow passage therethrough of the positioning fingers 8 and is welded or otherwise fastened to the frame plate 41 which likewise contains slots 43 in its inner circumference to permit the projection therethrough of the upright portion of the movable crank- or angle-shaped positioning fingers 8. Underneath frame plate 41 by means of countersunk machine screws 42, shown in Figure 3, are attached four finger spacer segment plates 44. Also attached to and below the frame plate 41 by cap screws 45 is a retaining ring 46, which supports a rotatable finger cam plate ring 47 beneath the spacer plates 44. The retaining ring 46 is provided with four radial slots or grooves 63 and the cam plate ring is provided with four L-shaped grooves 48. The grooves 48 are arranged so that they are not tangential to any circle concentric with the ring 46. Thus, when a finger pin 62 projecting into the long arm of the groove is held against movement tangential to the cam plate ring 47 by means of spacer plates 44 contacting the sides of the finger 8, to which the pin 62 is attached, said pin 62 and thereby finger 8 attached thereto will move radially, that is, to or from the axis, as the cam plate ring 47 is rotated. The short arm of L-shaped grooves 48 runs from the long arm to the inner circumference of the plate ring 47, as shown in Figure 3. As also shown in Figure 3, one of the finger plates 44 is provided with an extension lug 51, having attached thereto a link 52 by means of a countersunk pin 53 and to link 52 is attached a handle 54 and one end of linkage 55. The other end of linkage 55 is adjustably attached to cam plate ring 47 by means of bolt 56 held by a butterfly nut 57 in a slot 58 of a lug extension 59 of the cam plate ring 47.

To the underneath of the outer end of the crank-shaped finger 8 is attached the pin 62, which projects into the track formed by groove 48 in cam plate ring 47, whereby a movement of fingers 8 outwardly from the axis of the tubing or inwardly to the position shown in Figure 1 may be caused by manual operation of lever handle 54 and linkage 55, which rotates the cam plate ring 47. The short arm portion of groove 48 will register with radial slots 63 in the retaining ring 46 by rotating the cam plate ring 47 to proper position and is intended for occasional use to replace work pins 62 and for the removal and/or replacement of fingers 8 to accommodate couplings of different sizes. In this connection, bolt 56 and nut 57 are provided to permit changing the position of the linkage 55 in slot 58 for shifting the cam plate ring 47 with reference to retainer ring 46 in order to permit the matching of groove 48 with slot 63 to remove fingers 8 expeditiously.

Figure 2:
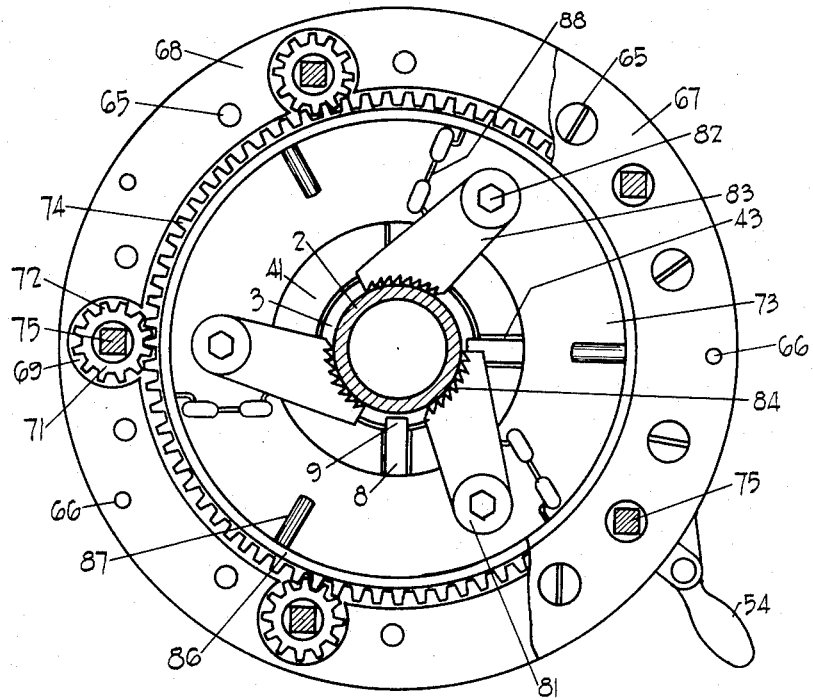
Figure 2 is a transverse cross-sectional view taken along the line II—II of Figure 1, the top cover plate being partially broken away.

Mounted on upper frame plate 41 by means of countersunk bolts 65, dowel pins 66 and top plate 67 is a large ring 68. In the inner circumference of ring 68 are circular recesses 69 formed by vertical bores, as shown in Figure 2. These recesses 69 are fitted with pinions 71 which are journaled in bottom frame plate 41 and top plate 67 and have teeth 72 protruding from the inner circumference of the ring 68 towards the axis thereof. Normally resting on frame plate 41 within the ring 68 is a ring gear 73, having teeth 74 in mesh with teeth 72 of pinions 71. Square pinion shaft extensions or studs 75, or any other suitable means for imparting rotational power to the pinions, protrude above the top plate 67. By grasping them with a conventional wrench or rotating tool, pinions 71 may be rotated. Disposed on the upper surface of ring gear 73 by means of jaw pins 80 and held thereon by washers 81 and cap screws 82 are three removable and pivoted jaw grips 83 of form similar to jaws 22 and having serrated faces 84 adapted to contact and grip the upset or thicker walled portion 2 of the usual well tubing 1, as shown in Figure 1. Resting on the upper surface of the ring gear 73 is positioned a tubular ring 86, adapted to form preferably a sliding fit within the top plate 67 and to form therewith a complete enclosure for ring gear teeth 74 and pinions 71. It may be seen that the pinion gears 71 are considerably longer axially than the ring gear 73 and the difference between the axial lengths thereof is preferably at least as long as the axial length of the threaded portion of any tubing that is expected to be disconnected by the device. By this arrangement the ring gear 73 with its jaws 83 engaged with the tubing is free to move axially upward until the outer edge of its upper face abuts the lower face of the top plate 67 and is thus adapted to ascend with the payout of the male threads until the tubing joint is completely unscrewed.

Attached to and projecting inwardly from the inside of the ring 86 are handle lugs 87 which enable the operator to rotate the ring 86 easily with respect to and over the ring gear 73. Spring rod assemblage 88, or other suitable resilient means, serve as connecting links between the ring 86 and the jaw grips 83 in a manner similar to spring rod assemblage 30.

As shown in Figures 8, 9 and 10, the operation of the device of the present invention is as follows: The device is supported above the casing head 90 by means of support brackets 93 carried by sleeves 94 which are fitted slidingly about stanchions 95 and held at a desired level by pins 96.

With the elevator 100 clamped about the tubing 1 below a coupling 3, as shown in Figure 8, the tubing is pulled up through the joint-breaking device by means of swivel hook 101, hoisting block 102 and the usual hoisting equipment (not shown) while the jaw grips 22 and 83 are held in their normal retracted position by the tension in the spring rod assemblies 30 and 88, respectively. As it is customary to pull up two joints of tubing and "break out," or disconnect at, every alternate joint, stacking the "doubles" in the derricks, the positioning fingers 8 are set in inoperative position by turning the cam plate ring 47 to its limit in a counter-clockwise direction (with the arrangement of grooves as shown in Figure 3) by means of a lever handle 54. After the coupling at the last joint which is not to be disconnected has passed through the device, the lever 54 is given a short movement in clockwise direction which shifts the cam plate ring 47 and the grooves 48 into which the finger pins 62 project and causes the finger pins 62 and therefore the fingers 8, of which the pins are an integral part, to move inwardly toward the tubing 1. As the finger flanges 9 contact the upset portion 2 of the tubing 1 just above the shoulder formed by the coupling 3, the whole device is carried upward a short distance with the ascending tubing until hoisting is stopped, as shown in Figure 9. The tubing 1 is then allowed to settle downward in the tubing slips 92, which have been positioned by the workmen.

Lever 18 is pulled in a clockwise direction, rotating ring 17, causing serrated faces 24 of jaws 22 to grip tightly around the coupling 3, as shown in Figures 1 and 4. The handle lug 87 (Figure 2) is then moved to rotate the ring 86 in a counter-clockwise direction, causing grips 83 to engage the upset portion of the tubing. A common ratchet-type wrench 103, or other suitable device, such as a power-operated wrench, is placed over one of the pinion studs 75 and a relatively small amount of rotating force is thus applied manually or mechanically to turn the studs 75, pinions 71, gear ring 73, and jaw grips 83 to break loose the threaded connection.

After the joint is once broken, the tubing may be speedily unscrewed from the coupling in any suitable manner, such as by the usual method of holding the tubing string below the broken joint stationary and rotating the tubing string above the broken joint by means of conventional hand tongs or spinning rope or by engaging one of the studs 75 with a power-operated device or wrench and therewith rotating the tubing above the broken joint, or alternately by holding the tubing about the broken joint stationary with a pair of tongs and rotating the tubing string below the broken joint with a power-driven rotary table. After releasing the grips 83 from the tubing, the hoist operator lifts the disconnected portion of the tubing and shifts it to the rack, where the elevator is disconnected. While the elevator is being lowered to position for clamping about the coupling which has just been unscrewed, the lower grips 22 are retracted from engagement with the tubing by means of handle 18, the positioning fingers are retracted by moving lever 54 in a counter-clockwise direction, and the joint-breaking device of the present invention is allowed to drop back onto the bracket supports 93, as shown in Figure 10.

This cycle of operations can then be repeated until all, or a desired length, of the tubing is withdrawn from the borehole and disconnected into the desired sections.

The present device, although especially adapted to disconnect sections of tubing or pipe as described above, may also be used to connect or "make up" sections of tubing or pipe by making certain easy changes in said device. Thus, after releasing the connections between the spring rod assemblages 30 and 88 and the jaws 22 and 83, respectively, the jaw grips 22 and 83 are removed from their pins 20 and 80, respectively, turned over and replaced thereon by removing the cap screws 26 and 82 and washers 25 and 81, respectively. The rings 17 and 86 are rotated so that the spring rod assemblages 30 and 88 are adjacent the side of pins 20 and 80 opposite to their former position, but on the same side of the jaws 22 and 83, respectively, since the jaws have been turned over. After reconnecting the spring rod assemblies 30 and 88 to jaws 22 and 83, respectively, the jaws 22 and 83 may be caused to grip the tubing by moving the lever handles 18 and 54 in a direction opposite to their former tubing-engaging direction, the device being now ready for screwing sections of tubing together.

The operation of screwing sections of tubing together is the reverse of the unscrewing operation, except that after "stabbing" or lowering the male thread portion 2 of the disconnected section of tubing 1 into the coupling 3, the ring 86 and ring gear 73 carrying jaws 83 are jointly raised to the top of their travel before clamping the jaws 83 on the upset portion 2 of the tubing 1 so that the ring gear 73 with jaws 83 will recede downward as the section of tubing is threaded into the coupling.

By removing the cap screws 26 and 82 and washers 25 and 81, the jaw grips 22 and 83 may be removed and replaced with longer or shorter jaws to accommodate various other sizes of tubing and pipe.

It is to be understood that the drawings and description are illustrative only of a preferred embodiment of the present invention and that the scope of the invention is limited solely by the appended claims. Thus, various modifications may be made without departing from the scope of the invention.

Figure 5:
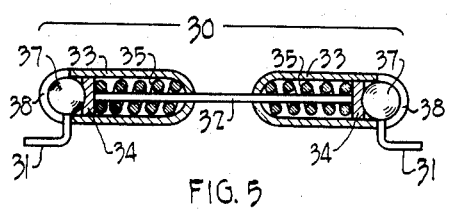
Figure 5 is a horizontal cross-sectional view of the spring rod detail.
Figure 7:
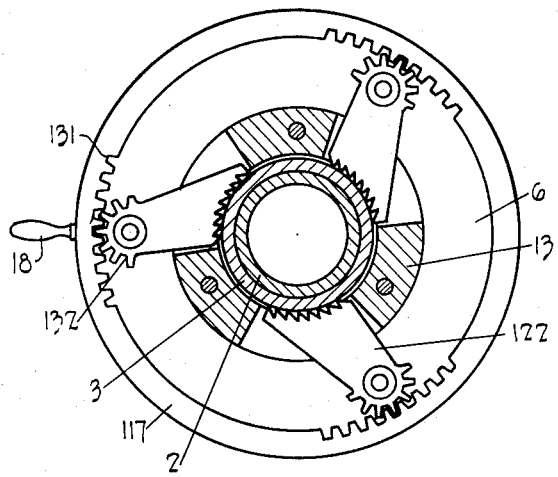
Figure 7 is another alternate arrangement of the section shown in Figure 4.
Figure 6:
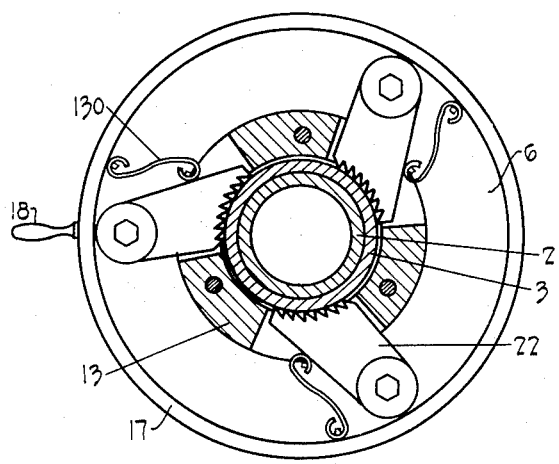
Figure 6 is an alternate arrangement of the section shown in Figure 4.

For example, instead of a spring rod assemblage 30 as shown in Figures 4 and 5, a flat spring 130 may be substituted therefor, as shown in Figure 6. Or, as shown in Figure 7, ring 117, which corresponds to ring 17, may be formed with an internal gear 131 meshing with gear teeth 132 on the outer pivoted end of jaws 122, which are otherwise similar to jaws 22. Likewise, similar modifications and substitutions can be made in spring rod assemblage 88 and its adjacent parts.

I claim as my invention:

1. A device for connecting and disconnecting oil well tubing couplings, said device comprising a tubular housing having an axial passage therethrough for the tubing, a plurality of movable positioning fingers held in a horizontal plane in said housing, means for moving said fingers radially into said passage against the tubing, said fingers being adapted to support the housing from the upper shoulder of a coupling when the fingers are moved against the tubing, lower gripping means held in said housing below said fingers, means for moving said gripping means into a gripping engagement with said coupling, upper gripping means held in said housing above said fingers, means for moving said gripping means into a gripping engagement with the tubing above the coupling, and means to rotate said upper gripping means together with the tubing gripped thereby while maintaining the lower gripping means and the coupling gripped thereby stationary.

2. A device for connecting and disconnecting oil well tubing couplings, said device comprising a tubular housing having an axial passage therethrough for the tubing, a plurality of movable positioning fingers held in a horizontal plane in said housing, means for moving said fingers radially into said passage against the tubing, said fingers being adapted to support the housing from the upper shoulder of a coupling when the fingers are moved against the tubing, lower gripping means held in said housing below said fingers, resilient means normally holding said gripping means in a retracted position, means for moving said gripping means into a gripping engagement with said coupling, upper gripping means held in said housing above said fingers, resilient means normally holding said gripping means in a retracted position, means for moving said gripping means into a gripping engagement with the tubing above the coupling, and means to rotate said upper gripping means together with the tubing gripped thereby while maintaining the lower gripping means and the coupling gripped thereby stationary.

3. A device for connecting and disconnecting oil well tubing couplings, said device comprising a tubular housing having an axial passage therethrough for the tubing, a plurality of movable positioning fingers held in a horizontal plane in said housing, means for moving said fingers radially into said passage against the tubing, said fingers being adapted to support the housing from the upper shoulder of a coupling when the fingers are moved against the tubing, lower gripping means held in said housing below said fingers, a lower annular member rotatable with regard to the housing, resilient means attaching said gripping means to said annular member whereby said gripping means are held in a normally retracted position, means for moving said lower gripping means into gripping engagement with said coupling by rotating said annular member, an upper annular member rotatable with regard to the housing above the fingers, upper gripping means carried by said upper annular member, a third annular member rotatable with regard to said upper annular member and to the housing, resilient means attaching said gripping means to said third annular member whereby said gripping means are held in a normally retracted position, means for moving said upper gripping means into gripping engagement with the tubing above the coupling by rotating said third annular member, and means to rotate said upper annular member together with the upper gripping means and the tubing gripped thereby while maintaining the lower gripping means and the coupling gripped thereby stationary.

4. A device for connecting and disconnecting oil well tubing couplings, said device comprising a tubular housing having an axial passage therethrough for the tubing, a plurality of movable positioning fingers held in a horizontal plane in said housing, means for moving said fingers radially into said passage against the tubing, said fingers being adapted to support the housing from the upper shoulder of a coupling when the fingers are moved against the tubing, lower gripping means held in said housing below said fingers, a lower annular member rotatable with regard to the housing, resilient means attaching said gripping means to said annular member whereby said gripping means are held in a normally retracted position, means for moving said lower gripping means into gripping engagement with said coupling by rotating said annular member, an upper annular member rotatable with regard to the housing above the fingers, said upper annular member having a toothed outside circumference, upper gripping means carried by said toothed annular member, a third annular member rotatable with regard to said toothed annular member and the housing, resilient means attaching said upper gripping means to said third annular member whereby said gripping means are held in a normally retracted position, means for moving said upper gripping means into gripping engagement with the tubing above the coupling by rotating said third annular member, and means comprising at least one pinion carried by the housing in meshing engagement with the toothed annular member to rotate said upper annular member together with the upper gripping means and the tubing gripped thereby while maintaining the lower gripping means and the coupling gripped thereby stationary.

5. A device for coupling and uncoupling oil well tubing joints, comprising a tubular housing having an axial passage therethrough for the tubing, a lower annular member rotatable with regard to the housing, said annular member having a toothed inside circumference, lower gripping means pivotably carried by said housing, means comprising teeth on said gripping means and in meshing engagement with said toothed annular member for moving said lower gripping means into gripping engagement with the tubing below the joint by rotating said annular member, an upper annular member rotatably carried by the housing above said lower gripping means, upper gripping means pivotably carried by said upper annular member, a third annular member rotatable with regard to said upper annular member and to the housing above the lower gripping means, said third annular member having a toothed inside circumference, means comprising teeth on said upper gripping means and in meshing engagement with said third toothed annular member for moving said upper gripping means into gripping engagement with the tubing above the joint by rotating the third annular member, and means to rotate said upper annular member together with the upper gripping means and the tubing gripped thereby while maintaining the lower gripping means and the tubing gripped thereby stationary.

6. A device for coupling and uncoupling oil well tubing joints comprising a tubular housing having an axial passage therethrough for the tubing, lower gripping means carried by said housing, means for moving said gripping means into a gripping engagement with the tubing below a tubing joint, a first annular member rotatably carried by the housing above said lower gripping means, upper gripping means pivotably carried by said first annular member, a second annular member rotatable with regard to said first annular member and to the housing above the lower gripping means, said second annular member having a toothed inside circumference, means comprising teeth on said upper gripping means and in meshing engagement with said second toothed annular member for moving said upper gripping means into gripping engagement with the tubing above the joint by rotating the second annular member, and means to rotate the first annular member together with the upper gripping means and the tubing gripped thereby while maintaining the lower gripping means and the tubing gripped thereby stationary.

7. A device for connecting and disconnecting oil well tubing couplings, said device comprising a tubular housing having an axial passage therethrough for the tubing, a plurality of movable positioning fingers held in a horizontal plane in said housing, means for moving said fingers radially into said passage against the tubing, said fingers being adapted to support the housing from the upper shoulder of a coupling when the fingers are moved against the tubing, gripping means held in said housing above said fingers, means for moving said gripping means into a gripping engagement with the tubing above the coupling, means to rotate said gripping means together with the tubing gripped thereby, and means for maintaining the coupling stationary while rotating the tubing above said coupling.

ROY E. FRANKLIN.